(12) United States Patent
Asmanis et al.

(10) Patent No.: US 8,429,439 B2
(45) Date of Patent: Apr. 23, 2013

(54) INTER-PAIR SKEW ADJUSTMENT

(75) Inventors: Georgios Asmanis, Lake Forest, CA (US); Faouzi Chaahoub, San Jose, CA (US)

(73) Assignee: Quellan, Inc., Santa Clara, CA (US)

( * ) Notice: Subject to any disclaimer, the term of this patent is extended or adjusted under 35 U.S.C. 154(b) by 564 days.

(21) Appl. No.: 12/469,450

(22) Filed: May 20, 2009

(65) Prior Publication Data
US 2010/0295591 A1 Nov. 25, 2010

(51) Int. Cl.
*G06F 1/04* (2006.01)
(52) U.S. Cl.
USPC .......... 713/503; 713/401; 327/161; 327/276; 375/346; 375/354; 348/192
(58) Field of Classification Search .............. 713/503
See application file for complete search history.

(56) References Cited

U.S. PATENT DOCUMENTS

| | | | |
|---|---|---|---|
| 6,385,435 B1 | 5/2002 | Lee | |
| 6,647,518 B1 | 11/2003 | Asmanis | |
| 6,897,694 B2* | 5/2005 | Jiguet et al. | 327/161 |
| 7,035,361 B2 | 4/2006 | Kim et al. | |
| 7,050,388 B2 | 5/2006 | Kim et al. | |
| 7,085,337 B2* | 8/2006 | Dyer et al. | 375/354 |
| 7,221,389 B2* | 5/2007 | Ahern et al. | 348/192 |
| 7,307,569 B2 | 12/2007 | Vrazel et al. | |
| 7,352,824 B2 | 4/2008 | Vrazel et al. | |
| 7,366,244 B2 | 4/2008 | Gebara et al. | |
| 7,493,509 B2* | 2/2009 | Fung et al. | 713/401 |
| 7,522,883 B2 | 4/2009 | Gebara et al. | |
| 7,650,526 B2* | 1/2010 | Alon et al. | 713/503 |
| 7,729,874 B2* | 6/2010 | Keady et al. | 702/89 |
| 2002/0191719 A1* | 12/2002 | Hasako et al. | 375/346 |
| 2004/0190661 A1 | 9/2004 | Vrazel | |
| 2007/0060059 A1 | 3/2007 | Kim et al. | |

* cited by examiner

*Primary Examiner* — Brian Misiura
(74) *Attorney, Agent, or Firm* — King & Spalding

(57) ABSTRACT

A skew adjustor that can reduce inter-pair skew between differential signals received via a cable is disclosed. In one embodiment, a skew adjustor includes: a skew detector that receives signals from a cable, and provides a detected skew amount when skew is detected between two of the signals; an offset controller for receiving the detected skew amount, and for providing a delay control signal in response thereto; and a skew delay circuit that receives the signals and the delay control signal, and enables one or more delay stages in a path of a first arriving of the two skewed signals based on the delay control signal, such that an adjusted skew between the two skewed signals at an output of the skew delay circuit is less than the detected skew amount by an amount corresponding to the enabled one or more delay stages.

19 Claims, 4 Drawing Sheets

INTER-PAIR SKEW ADJUSTMENT

FIELD OF THE INVENTION

The invention relates in general to signals associated with electronic devices, and more specifically to signal skew adjustment.

BACKGROUND

Signal propagation between computing or electronic devices typically involves cables (e.g., co-axial, twisted-pair, etc.). Inter-pair skew among signal pairs in the cables can limit a length of such cables. Many differential receivers, with or without re-timing, suffer from inter-pair skew between the positive and negative signals in a differential signal pair. Further, a maximum tolerable inter-pair skew in a differential system may be about 0.5 UI (unit intervals), and re-timer-based solutions may also suffer from inter-pair skew limitations, despite possible resetting of the timing and jitter budget.

SUMMARY

Particular embodiments include a skew adjustor that can reduce inter-pair skew between differential signals received from a cable. In one embodiment, a skew adjustor includes: a skew detector that receives signals from a cable, and provides a detected skew amount when skew is detected between two of the signals; an offset controller for receiving the detected skew amount, and for providing a delay control signal in response thereto; and a skew delay circuit that receives the signals and the delay control signal, and enables one or more delay stages in a path of a first arriving of the two skewed signals based on the delay control signal, such that an adjusted skew between the two skewed signals at an output of the skew delay circuit is less than the detected skew amount by an amount corresponding to the enabled one or more delay stages.

In one embodiment, a method of adjusting skew can include: receiving a plurality of signals in a skew detector, the signals being from a cable coupled to a transmitter; detecting a skew amount between two of the plurality of signals in the skew detector; providing a delay control signal from an offset controller that receives the detected skew amount; and enabling one or more delay stages in a path of a first arriving of the two skewed signals based on the delay control signal, such that an adjusted skew between the two skewed signals at an output of the skew delay circuit is less than the detected skew amount by an amount corresponding to the enabled one or more delay stages.

DETAILED DESCRIPTION

Particular embodiments allow for compensation of signal skew between signals in a cable. A skew adjustor in particular embodiments is suitable for implementations in locations proximate (e.g., in a cable connector) to a sink side of a signal channel, or to other locations proximate to the cable. Further, any suitable voltage levels, or number of signals in the cable, can be accommodated in particular embodiments. Various delay circuits and control designs can be utilized to effectively target particular signal or cable characteristics. As described herein, the various delay circuits and associated circuitry may have different arrangements to adapt to the particular constraints of different applications.

A maximum length of cable that can be activated may be limited either by an equalizer's maximum boost capability, or from a maximum tolerable inter-pair skew. Expected losses and "S21" response of the signals from a given cable provides a strong function relative to that cable's length, relative to an inter-cable variance of such a S21 response. In contrast, an expected inter-pair skew of signals from a given cable is a relatively weak function of the cable's length (expected value of 0), while the variance of such a parameter may be proportional to the cable's length.

Inter-pair skew numbers can range from about 5 ps to about 10 ps per meter of cable, depending on a quality of the cable's manufacturing tolerances. There may also be yield limitation due to such inter-pair skew variance, whereby an inherent maximum tolerance of a differential system may be about 0.5 UI (unit intervals). In order for an equalizer to extend a cable reach to a given length, the equalizer should be able to equalize that cable's S21 and skew, while maintaining high cable yields. Given an active cable yield specification, a maximum cable length that can be equalized may be limited either by the cable's S21 bands, or the cable's inter-pair skew bands.

A receiver equalizer effectiveness may be limited by an inter-pair skew from a maximum cable length of from about 5 m to about 10 m. If there is no inter-pair skew, a boost capability of the equalizer can enable activation of a cable having a length greater than about 10 m. While an expected inter-pair skew of a cable is zero, the standard deviation is greater than zero. Thus, inter-pair skew may result in a yield limitation, while the equalizer's boost provides an expected maximum cable length limitation.

To improve equalizer yield in particular embodiments, inter-pair skew compensation circuitry may be used to effectively extend a reach of the equalizer to and beyond cable lengths of about 10 m, without reducing associated yield. Given an inter-pair skew tolerance of about 0.5 UI for an uncompensated differential system, an additional 0.5 UI inter-pair skew adjustment due to adjustor circuitry can allow for inter-pair skew tolerance of about 1 UI.

Figure 1:
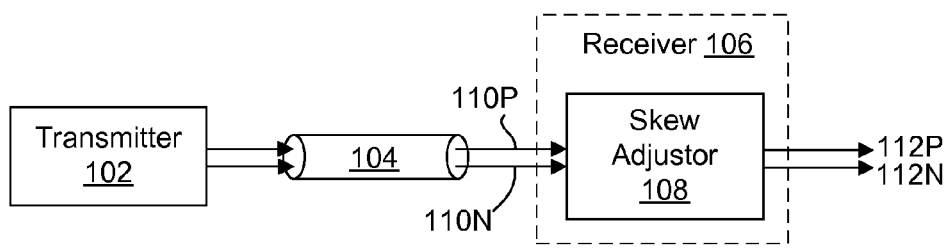
FIG. 1 is a block diagram showing an example skew adjustor arrangement.

Referring now to FIG. 1, shown is a block diagram of an example skew adjustor arrangement 100. Transmitter 102 can transmit signals via cable 104. For example, cable 104 can be any suitable type of connection, such as a co-axial cable, a twisted-pair, or any type of bus (e.g., a serial peripheral interface (SPI), a universal serial bus (USB), inter-integrated circuit bus (I²C), any DC-coupled open drain interfaces, as well as double (sink and source) terminated DC-coupled interfaces, etc.) to provide a connection. Further, a signal channel within cable 104 can include any suitable type of signaling (e.g., differential pair, current signaling, voltage signaling, etc.). For example, differential signals 110P (positive) and 110N (negative) can be provided via cable 104.

Receiver 106 can include skew adjustor 108, which can provide differential pair output 112P/112N. One or more components of skew adjustor 108 can be implemented within cable 104, or at or near a connection module or connector associated with a termination of cable 104. For example, one or more of such components can be proximate (e.g., in a printed circuit board (PCB) trace, or a chip within a connector channel) to a sink side (e.g., a television) in a high-definition multimedia interface (HDMI) application. In another example, an HDMI lane extender can include one or more of such the components when the signal channel is the HDMI cable.

Transmitter 102 can be, e.g., a digital video disc (DVD) player as an HDMI transmitter or source. In just one example, cable 104 may thus be an HDMI cable, having a connector or connection module at a sink termination side, which can connect to receiver 106. Skew adjustor 108 can be integrated within a connector to cable 104, or otherwise located proximate to cable 104. In this fashion, longer cables 104 (e.g., about 10 m, 20 m, 30 m, etc., and depending on the cable gauge) can be accommodated because skew that develops along such cable routes can be compensated for using skew adjustor 108. Further, for signal protocols that operate in a bidirectional fashion, such skew adjustors 108 can be employed at either end of cable 104.

Figure 2:
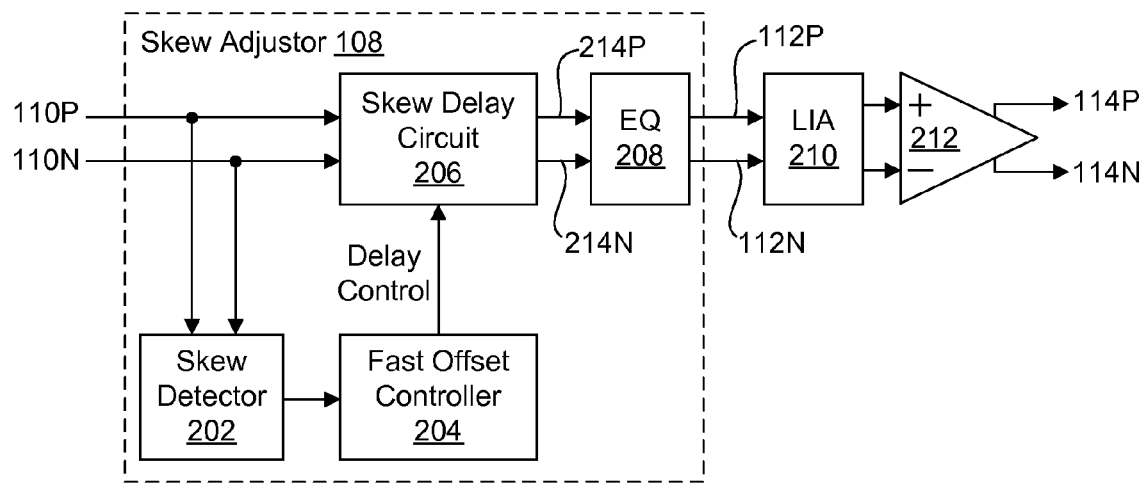
FIG. 2 is a block schematic diagram showing an example skew adjustor structure.

Referring now to FIG. 2, shown is a block schematic diagram of an example skew adjustor structure 200. Skew adjustor 108 can include skew detector 202, which can be used to sense inter-pair skew to determine an amount of skew on signals 110P/110N. Fast offset controller 204 can receive the determined or detected skew amount from skew detector 202, and may generate an analog/continuous, digital/quantized, or any other suitable type of delay control signal (e.g., DCTL<0:7> in FIG. 3 below) for driving the delay control of skew delay circuit 206.

Skew delay circuit 206 can thus receive a delay control signal from fast offset controller 204 that is based on the detected skew amount. This inter-pair skew adjustment circuitry can delay one side (e.g., a positive side) of the differential signal with respect to the other side (e.g., a negative side) to provide skew adjusted pair 214P/214N. In addition, both sides 214P/214N can be equalized via equalizer 208 to cancel the cable's differential S21 response. Equalized signal pair 112P/112N from equalizer 208 can then be provided to limiting input amplifier (LIA) 210. Buffer 212 can receive signals from LIA 210, and provide output differential pair 114P/114N.

Of course, many variations of the particular example shown in FIG. 2 may be found in certain embodiments. For example, multiple or different types of equalizers, delay circuits, controls, other types of cables, ordering and locations of components, as well as different connection points for the skew adjustor circuitry can be selected. Other types of circuitry for amplification or other functions can also be included. Further, any suitable skew detection can be used for skew detector 202 in particular embodiments. For example, skew detector 202 can include a phase detector, whereby a DC level of an XOR function is probed on chip for adaptive control. Skew detection can also be accomplished by probing a rise and fall time of the differential signals via a scope, or probing a common source of LIA 210 via a spectrum analyzer. In addition, skew adjustment can be either static or adaptive, and may be implemented in any suitable location (e.g., on-chip or off-chip, relative to other associated circuitry).

Figure 3:
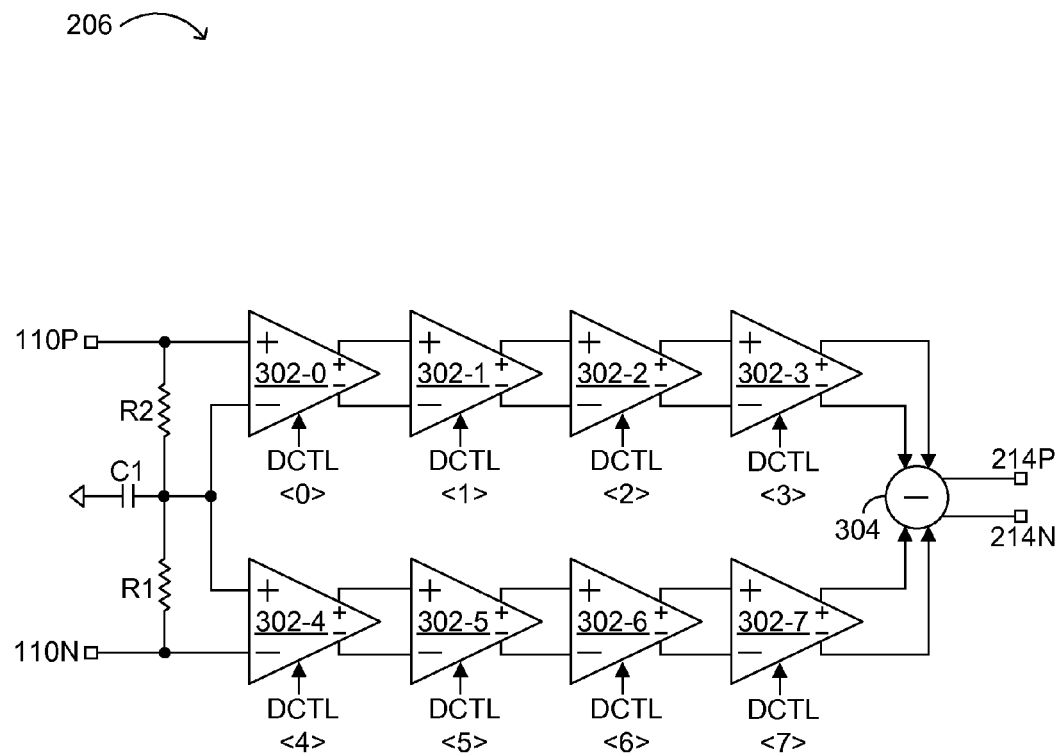
FIG. 3 is a block schematic diagram showing an example skew delay circuit.

Referring now to FIG. 3, shown is a block schematic diagram of an example skew delay circuit 206. In this example, two separate delay paths are used, with one for the positive input (e.g., 110P), and one for the negative input (e.g., 110N). In this fashion, an incremental skew adjustment of about 50 ps, in addition to about 0.5 UI tolerated by LIA 210, can be provided. Particular embodiments can maintain a relatively high power supply rejection ratio (PSRR) of a differential configuration, and also extended a maximum cable reach. Further, separate skew and equalization control may be used to allow for frequency-dependant skew, or the two functions can be merged in applications where the skew is only a weak function of frequency. Delay circuit 206 can also be implemented in separate circuitry, or may be integrated with EQ 208 circuitry.

In this particular example, delay stages 302-0, 302-1, 302-2, and 302-3, can be arranged to provide positive side delay on signal 110P. Similarly, delay stages 302-4, 302-5, 302-6, and 302-7, can be arranged to provide negative side delay on signal 110N. Each delay stage 302 can be controlled via a delay control signal (e.g., DCTL<7:0>) that is analog/continuous, digital/quantized, or in any other suitable form. Outputs via delay stages 302-3 and 302-7 can be combined in summation circuit 304 to extract the difference between output signals from delay stages 302-3 and 302-7, to reject their common mode, and to provide output differential pair 214P/214N. In addition, resistors R1 and R2, along with capacitor C1 can extract a common mode voltage of the differential 110P and 110N signal.

In particular embodiments, no clock control is necessary, and delay adjustment can be static or dynamic, depending on the scheme. Particular embodiments can substantially eliminate signal to noise ratio (SNR) and bit error rate (BER) degradation due to inter-pair skew. This allows cable manufactures to produce less costly cables using less stringent manufacturing tolerances, without substantially affecting cable yields.

Figure 4:
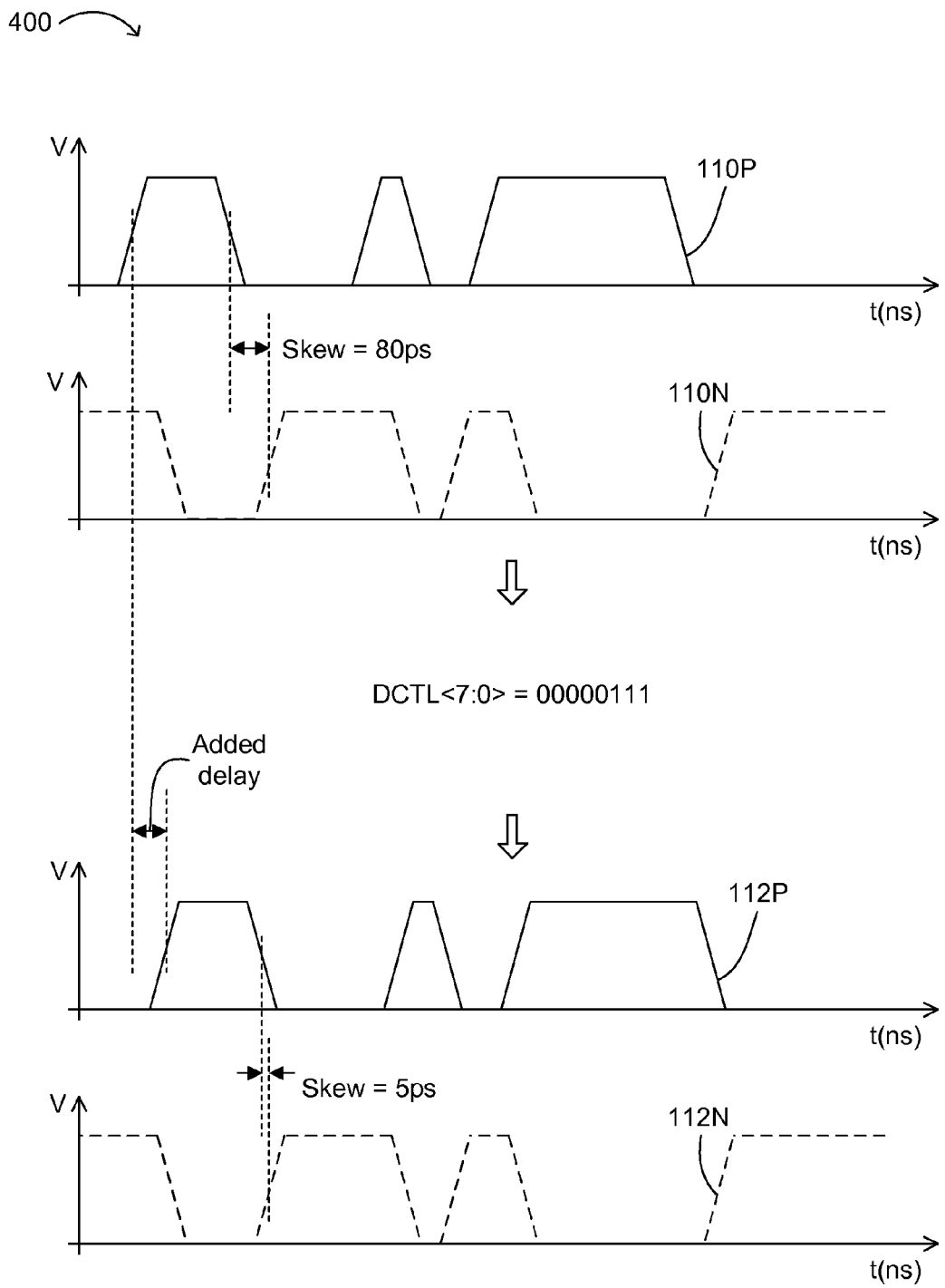
FIG. 4 is a waveform diagram showing an example skew adjustment operation.

Referring now to FIG. 4, shown is a waveform diagram of an example skew adjustment operation 400. In this particular example, differential pair 110P/110N may have a skew of about 80 ps. This skew can be measured by skew detector 202, and provided to fast offset controller 204. For example, fast offset controller 204 may set DCTL<7:0>=00000111 such that delay stages 302-0, 302-1, and 302-2 are enabled, while delay stages 302-3, 302-4, 302-5, 302-6, and 302-7, are disabled so that no additional delay is added to the corresponding signal. For example, if each delay stage 302 provides 25 ps of delay, the adjusted skew can be reduced to about 5 ps. Alternatively, delay control signals DCTL can be analog instead of digital to adjust corresponding delay provided by delay stages 302.

Figure 5:
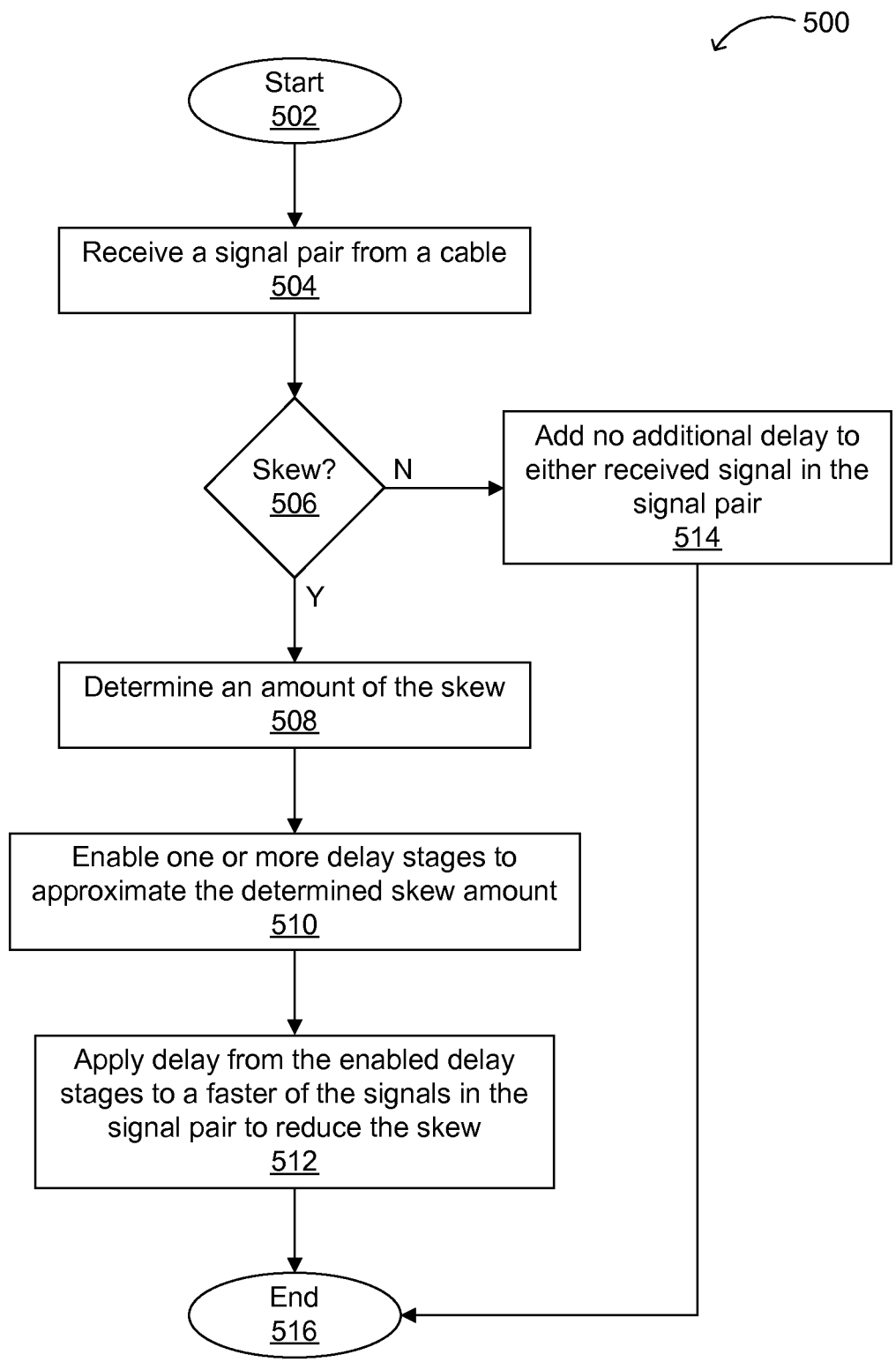
FIG. 5 is a flow diagram showing an example method of adjusting signal skew.

Referring now to FIG. 5, shown is a flow diagram of an example method of adjusting signal skew 500. The flow begins (502), and a signal pair is received from a cable (504). If no skew is detected (506), no additional delay is added to either received signal in the signal pair (514). However, if skew is detected (506), an amount of the skew is determined (508). One or more delay stages can then be enabled to approximate the determined skew amount (510). Delay from the enabled delay stages is then applied to a faster or first arriving of the signals in the signal pair to reduce the skew (512), completing the flow (516).

Skew adjustors as described herein can adjust signal skew from a cable to allow for increased cable lengths. These skew adjustors are particularly suitable for implementation near sink sides of cables, where inter-pair signal skew is apt to affect receiver operation. In addition, any suitable technology (e.g., CMOS, Bi-CMOS, etc.) and feature sizes (e.g., 0.18 µm, 0.15 µm, with 0.13 µm, etc.) can be used to implement circuits and functions as described herein.

Although particular embodiments of the invention have been described, variations of such embodiments are possible and are within the scope of the invention. For example, although particular delay circuit arrangements and controls have been described and shown, other types of delay circuits and the like can also be accommodated in accordance with various aspects. Further, while four stages of delay are shown for each differential signal path polarity, any number of stages and/or other types of delay circuitry, etc., can also be used in particular embodiments. Also, applications other than skew adjustment from differential pair cable signaling or the like can also be accommodated in accordance with particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A skew adjustor, comprising:
a skew detector that receives a plurality of signals from a cable and provides a detected skew amount when skew is detected between two of the plurality of signals, the cable comprising at least one pair of differential signal conductors and each of the two of the plurality of signals comprising a signal from a respective conductor of one pair of the differential signal conductors;
an offset controller that receives the detected skew amount and provides a delay control signal in response thereto; and
a skew delay circuit comprising
a common mode extraction circuit that extracts a common mode voltage between the two of the plurality of signals,
one or more delay stages enabled according to the delay control signal that delay at least one of the two of the plurality of signals with reference to the common mode voltage, wherein an adjusted skew between the two of the plurality of signals at an output of the skew delay circuit is less than the detected skew amount by an amount corresponding to the enabled one or more delay stages, and
a summation circuit that receives an output of the one or more delay stages, rejects the common mode voltage from the output of the one or more delay stages, and provides the output of the skew delay circuit,
wherein the two of the plurality of signals comprise positive and negative signals of a pair of differential signals.

2. The skew adjustor of claim 1, further comprising an equalizer coupled to the output of the skew delay circuit.

3. The skew adjustor of claim 2, further comprising a limiting input amplifier (LIA) coupled to an output of the equalizer.

4. The skew adjustor of claim 1, wherein each of the delay stages comprises a predetermined fixed delay.

5. The skew adjustor of claim 1, wherein each of the delay stages comprises an adjustable delay.

6. The skew adjustor of claim 1, wherein the skew detector comprises a phase detector.

7. The skew adjustor of claim 1, wherein the skew delay circuit comprises four delay stages for each conductor of the one pair of the differential signal conductors.

8. The skew adjustor of claim 1, wherein the delay control signal comprises a digital delay control signal.

9. The skew adjustor of claim 1, being implemented in a connector of a cable.

10. The skew adjustor of claim 1, being implemented in a cable, wherein a transmitter and a receiver are coupled via the cable.

11. The skew adjustor of claim 1, wherein a difference between the adjusted skew and the detected skew is less than about 150 ps.

12. A method of adjusting skew, the method comprising:
receiving, by a skew detector, a plurality of signals from a cable coupled to a transmitter, the cable comprising at least one pair of differential signal conductors;
detecting, by the skew detector, a skew amount between two of the plurality of signals, each of the two of the plurality of signals comprising a signal from a respective conductor of one pair of the differential signal conductors;
providing, by an offset controller, a delay control signal based on the detected skew amount;
extracting, by a common mode extraction circuit of a skew delay circuit, a common mode voltage between the two of the plurality of signals; and
enabling one or more delay stages of the skew delay circuit according to the delay control signal and delaying at least one of the two of the plurality of signals with reference to the common mode voltage, and
summing, by a summation circuit of the skew delay circuit, an output of the one or more delay stages, rejecting the common mode voltage from the output of the one or more delay stages, and providing an output of the skew delay circuit,
wherein
an adjusted skew between the two of the plurality of signals at the output of the skew delay circuit is less than the detected skew amount by an amount corresponding to the enabled one or more delay stages, and the two of the plurality of signals comprise positive and negative signals of a pair of differential signals.

13. The method of claim 12, further comprising equalizing the output of the skew delay circuit.

14. The method of claim 13, further comprising amplifying the equalized output of the skew delay circuit.

15. The method of claim 12, wherein the detecting the skew amount comprises detecting a phase difference using a phase detector.

16. The method of claim 12, further comprising adjusting a delay of one or more of the delay stages.

17. The method of claim 12, wherein the enabling one or more delay stages comprises adding a predetermined fixed delay amount.

18. An apparatus, comprising:
means for receiving a plurality of signals from a cable coupled to a transmitter, the cable comprising at least one pair of differential signal conductors;
means for detecting a skew amount between two of the plurality of signals that comprise positive and negative signals of a pair of differential signals, each of the two of the plurality of signals comprising a signal from a respective conductor of one pair of the differential signal conductors;
means for providing a delay control signal based on the detected skew amount;
means for extracting a common mode voltage between the two of the plurality of signals;
means for enabling one or more delay stages according to the delay control signal and delaying at least one of the two of the plurality of signals with reference to the common mode voltage; and
means for summing an output of the one or more delay stages, rejecting common mode voltage from the output of the one or more delay stages, and providing a skew delay output.

19. A method comprising:
receiving a plurality of signals from a cable that couples to a transmitter and comprises a pair of differential signal conductors;
detecting skew amount between two of the plurality of signals that comprise positive and negative signals of a pair of differential signals, each of the two of the plurality of signals comprising a signal from a respective conductor of the pair;
providing a delay control signal based on the detected skew amount;
extracting a common mode voltage between the two of the plurality of signals;
enabling one or more delay stages according to the delay control signal and delaying at least one of the two of the plurality of signals with reference to the common mode voltage; and
summing an output of the one or more delay stages and rejecting common mode voltage from the output.

* * * * *